Jan. 11, 1949.  E. ARMSTRONG  2,459,058
WIPER DEVICE FOR CAR AXLE JOURNALS AND THE LIKE
Filed Feb. 19, 1944
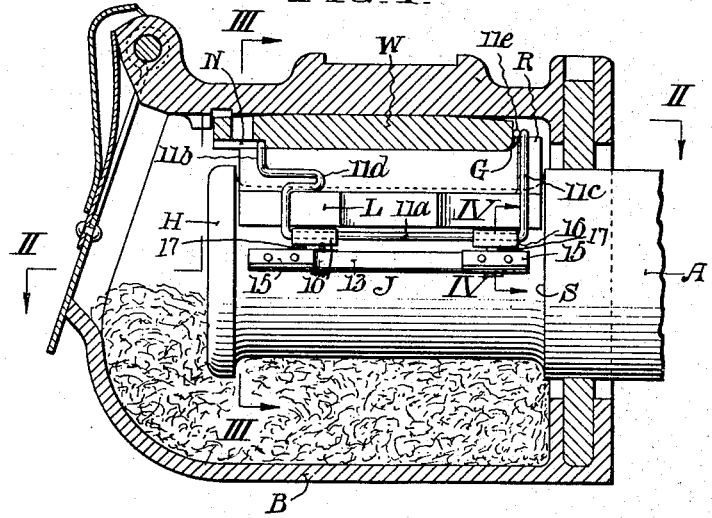
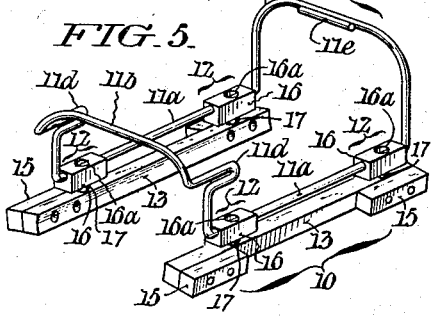
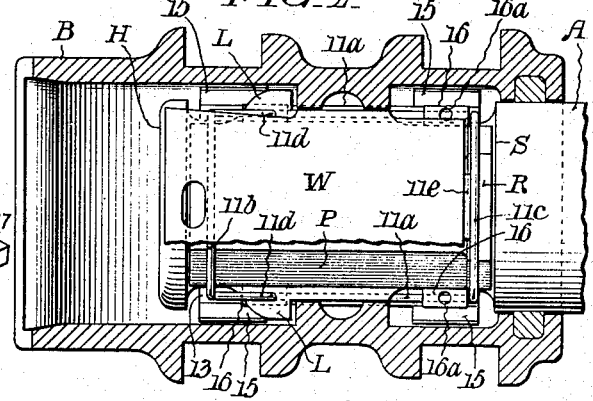
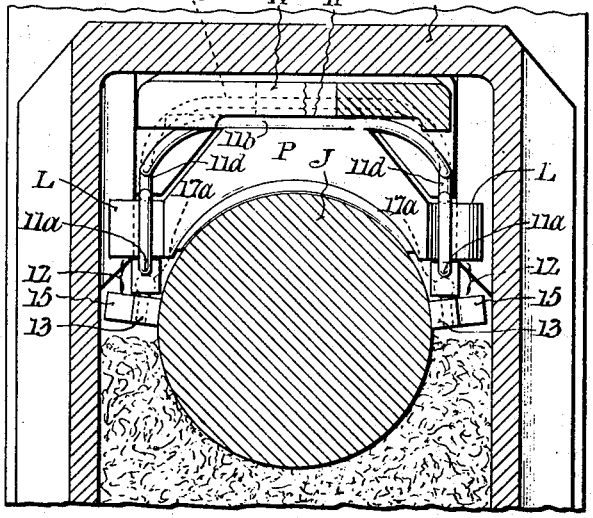
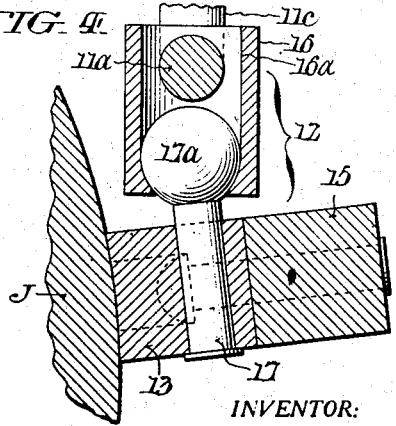
INVENTOR:
Ernest Armstrong,
BY
ATTORNEYS.

Patented Jan. 11, 1949

2,459,058

UNITED STATES PATENT OFFICE 2,459,058

WIPER DEVICE FOR CAR AXLE JOURNALS AND THE LIKE

Ernest Armstrong, Camden, N. J.

Application February 19, 1944, Serial No. 523,104

7 Claims. (Cl. 308—89)

This invention relates to wiper devises useful more especially in connection with car axle journals which, after common practice, are lubricated through contact with oil-saturated sponging cotton waste packed into the bottoms of the journal boxes. With time the fibers of the waste are broken into small bits through friction with the journals as well as with the walls of the journal boxes, and the waste fragments carried up by the journals during rotation of the latter to the bearing plates. The resulting accumulations are commonly referred to as "waste grabs" and are often directly responsible for development of hot boxes, especially when the oil supply is depleted or when the waste has deteriorated and receded out of contact with the journals.

The chief aim of my invention is to obviate this contingency, that is to say, to prevent the waste particles from reaching the bearing plates for the axle journals within the axle boxes. This desideratum I make possible of realization as hereinafter more fully disclosed, through provision of a simple and inexpensive wiper device which is capable of ready and easy installation in standard types of car axle journal boxes, which is characterized by having wiper bars suspended in such a way as to bear evenly throughout their lengths against the opposite sides of the axle journal under sufficient pressure to intercept the waste particles before they can reach the bearing plates, and which moreover is reliable in operation and resistive to easy derangement in use.

A further aim of my invention is to make possible the utilization of the wiper bars of a device having the above attributes as a means for absorbing and retaining lubricant for application and distribution uniformly over the surface of the axle journal. This objective I attain as also hereinafter more fully set forth, by constructing the wiper bars from a suitable porous antifriction material.

Other objects and attendant advantages will appear from the following detailed description of the attached drawings, wherein Fig. 1 is a longitudinal sectional view of a typical car journal box with a journal wiping device of my invention in place therein.

Fig. 2 is a horizontal section in the plane of the axis of the wheel axle taken as indicated by the angled arrows II—II in Fig. 1.

Fig. 3 is a fragmentary view in cross section taken as indicated by the angled arrows III—III in Fig. 1.

Fig. 4 is a fragmentary detail sectional view taken as indicated by the angled arows IV—IV in Fig. 1 and drawn to a larger scale; and Fig. 5 is a perspective view of the wiping device.

As herein shown, the journal wiping device of my invention which I have comprehensively designated by the numeral 10 in Fig. 5 comprises a supporting component in the form of a frame 11. Preferably this frame 11 is fashioned to the configuration shown from stout round wire with two straight longitudinal side portions 11a which are connected by transverse upstanding yoked end portions 11b and 11c whereof the first is formed with inward retroversions 11d in parallel relation to the side portions 11a, and the latter provided centrally of its inner side with a permanently attached supplemental strip 11e for the purpose of adding to its width. From Figs. 1–3 it will be noted that the frame 11 is held in place in the journal box B through engagement of its yoke 11b over the top of the flat outer end of the usual bearing plate P exposed at the notch N in the bottom of the usual wedge plate W and through engagement of its other yoke over the ridge R at the inner end of said bearing plate P. Longitudinal shifting of the frame 11 is prevented through abutment of the yokes 11b with the inner end of the notch N in the wedge plate W, and the strip 11e on the yoke 11c with the rear end of said plate, said strip serving to bridge the gap occasioned by rounding of the bearing plate P at G. The frame 11 is additionally supported through engagement of the retroversions 11d of its yoke 11b over the usual frontal side lugs L of the bearing plate P.

Suspended by universal pivot connections 12 from the respective longitudinal side portions 11a of the hanger component 11 so as to rest evenly against the opposite sides of the journal J in the interval between the end flange head H and the shoulder S are wiper bars 13 which are preferably made from oil-absorbing and retaining anti-friction metal such as porous bronze. As shown, the wiper bars 13 are substantially square in cross section and biased toward the journal J by weights 15 attached to their outsides adjacent their opposite ends. If found more desirable or convenient in practice the weights may be formed as integral portions of the wiper bars 13. Each of the universal pivot connections 12 includes, as shown in Fig. 4, a collar in the form of a block 16 which is free to swing on the corresponding longitudinal side portion 11a of the frame 11 and which provides a socket 16a for the ball head 17a at the upper end of a stud 17 secured in the wiper bar 13.

By reason of being positioned as shown and suspended in the manner described, the wiper bars 13 will intercept waste fragments which may be carried up by the journal J irrespective of the direction of rotation of the axle A, thus preventing them from reaching the bearing plate P and precluding the formation of waste grabs. In addition the wiper bars, due to their porosity, will absorb and retain oil carried up from the sponging waste in the bottom of the journal box and cause it to be evenly distributed over the surface of the journal.

Having thus described my invention, I claim:

1. A wiper device for a car axle journal box wherein a wedge plate is interposed between the top wall of said journal box and a bearing plate resting on the journal, said device comprising a pair of wiper bars adapted to bear longitudinally against opposite sides of the axle journal at a level below the bearing plate; and a supporting frame having transverse yoked end portions for respectively engaging over the opposite ends of the bearing plate and abutting end surfaces of the wedge plate, and longitudinal side portions between the yoked end portions from which the wiper bars are hung.

2. A wiper device for car axle journals according to claim 1, wherein one of the yoked end portions of the supporting frame has inward projections at opposite sides thereof for engaging over lateral lugs on the bearing plate.

3. A wiper device for car axle journals according to claim 1, wherein the supporting frame is fashioned from stout wire.

4. A wiper device for car axle journals according to claim 1, wherein the supporting frame is fashioned from stout wire; and wherein one of the yoked end portions of the frame has inward projections at opposite sides thereof formed by retroversions of the wire for engaging over lateral lugs on the bearing plate.

5. A wiper device for use in a car axle journal box wherein a wedge plate is interposed between its top wall and a bearing plate resting on the axle journal, said device comprising a pair of wiper bars adapted to bear longitudinally against opposite sides of the axle journal at a level below the bearing plate; and a supporting frame having transverse yoked end portions for engaging over the ends of the bearing plate and abutting end surfaces of the wedge plate, and longitudinal connecting side portions between the yoked end portions; and wherein the wiper bars are hung by universal pivot connections from the longitudinal side portions of the supporting frame.

6. In a car wheel axle journal box or the like, a wiper device comprising a pair of longitudinally arranged wiper bars; means for pivotally supporting the bars in free suspension alongside the journal respectively at opposite sides thereof; and weight means influencing the bars individually to urge them inward for maintenance in light frictional contact with the journal.

7. In a car wheel axle journal box or the like, in which a bearing plate rests on the top of the journal, a wiper device comprising a pair of longitudinally arranged wiper bars; a frame with yokes adapted to engage over opposite ends of the bearing plate and supporting the bars in free suspension respectively along opposite sides of the journal; and weight means influencing the bars individually to urge them inward for maintenance in light frictional contact with the journal.

ERNEST ARMSTRONG.

REFERENCES CITED

The following references are of record in the file of this patent:

UNITED STATES PATENTS

| Number | Name | Date |
|---|---|---|
| Re. 17,972 | Miller | Feb. 17, 1931 |
| 1,058,060 | Hyle | Apr. 8, 1913 |
| 1,638,797 | Claus | Aug. 9, 1927 |
| 1,930,658 | Pilcher | Oct. 17, 1933 |
| 2,066,593 | Walker | June 5, 1937 |
| 2,125,141 | Yancey | July 26, 1938 |
| 2,129,812 | Bissell | Sept. 13, 1938 |
| 2,198,654 | Calkins | Apr. 30, 1940 |
| 2,271,117 | Carnarius | Jan. 27, 1942 |
| 2,328,883 | Wilson | Sept. 7, 1943 |